(12) United States Patent
Hayashi et al.

(10) Patent No.: US 6,253,029 B1
(45) Date of Patent: Jun. 26, 2001

(54) VACUUM PROCESSING APPARATUS

(75) Inventors: Kazuichi Hayashi; Teruo Iwata, both of Yamanashi-ken (JP)

(73) Assignee: Tokyo Electron Limited, Tokyo-To (JP)

( * ) Notice: Subject to any disclaimer, the term of this patent is extended or adjusted under 35 U.S.C. 154(b) by 0 days.

(21) Appl. No.: 09/213,359

(22) Filed: Dec. 17, 1998

Related U.S. Application Data

(63) Continuation of application No. 08/672,363, filed on Jun. 28, 1996, now Pat. No. 5,879,139.

(30) Foreign Application Priority Data

Jul. 7, 1995 (JP) .................................................. 7-196122

(51) Int. Cl.$^7$ ...................................................... F24H 1/08
(52) U.S. Cl. .............................. 392/471; 417/292; 415/90
(58) Field of Search .................................... 417/292, 244, 417/313, 423.1; 415/90, 176–178

(56) References Cited

U.S. PATENT DOCUMENTS

| | | | |
|---|---|---|---|
| 3,164,320 | * | 1/1965 | Welbourn . |
| 3,506,380 | * | 4/1970 | Powell . |
| 3,981,627 | * | 9/1976 | Kantor . |
| 4,512,725 | * | 4/1985 | Saulgeot . |
| 4,904,155 | * | 2/1990 | Nagaoka et al. . |
| 4,929,151 | * | 5/1990 | Long et al. ............................ 415/177 |
| 5,062,271 | * | 11/1991 | Okumura et al. . |
| 5,443,368 | * | 8/1995 | Weeks et al. . |
| 5,513,499 | * | 5/1996 | DeRijke et al. . |
| 5,618,167 | * | 4/1997 | Hirakawa et al. .................... 417/372 |
| 5,879,139 | * | 3/1999 | Hayashi et al. ...................... 417/292 |

\* cited by examiner

Primary Examiner—Teresa Walberg
Assistant Examiner—Thor Campbell
(74) Attorney, Agent, or Firm—Smith, Gambrell & Russell, LLP

(57) ABSTRACT

The inside of a vacuum pump is heated by means of a first heating unit to a temperature higher than the temperature at which products of reaction discharged from a process chamber are separated, and the inner surface of an exhaust pipe is heated to a temperature higher than the separation temperature by means of a second heating unit. If a vacuum process is carried out in the process chamber in this state, exhaust gas discharged from the process chamber can pass in a gaseous phase through the exhaust pipe and the vacuum pump without separating its unwanted by-products. Since a trap unit is located on the downstream side of the vacuum pump, moreover, the reaction products and the like can be prevented from adhering to the inside of the vacuum pump so that the maintenance operation is easier, although the conductance of the exhaust pipe is lowered so that the trap unit and the vacuum pump can be reduced in size.

8 Claims, 3 Drawing Sheets

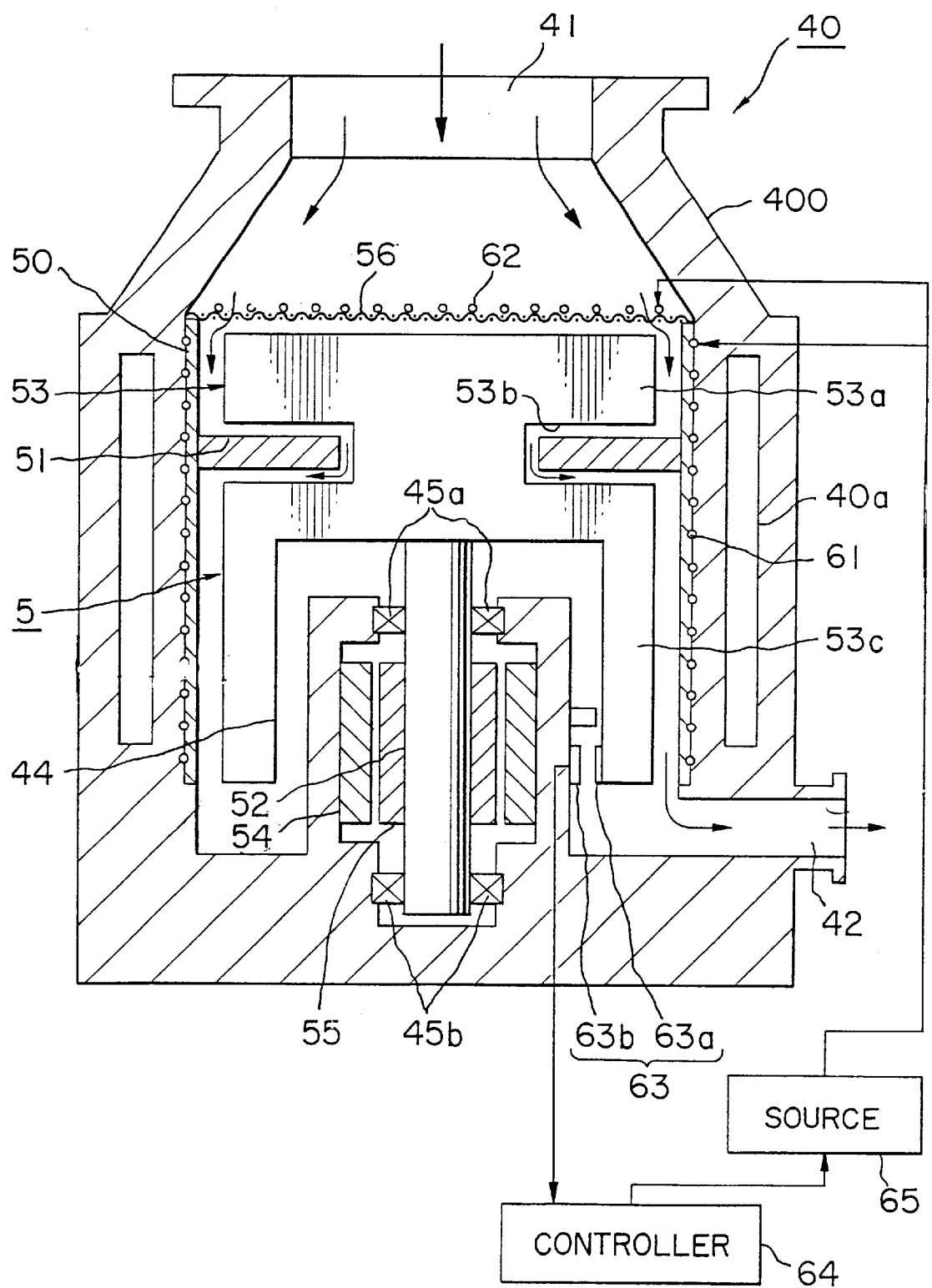
F I G. 2

VACUUM PROCESSING APPARATUS

This application is a continuation of Ser. No. 08/672,363 Jun. 28, 1996 U.S. Pat. No. 5,879,139.

BACKGROUND OF THE INVENTION

1. Field of the Invention

The present invention relates to a vacuum processing apparatus with a vacuum pump, in which products of reaction in exhaust gas can be prevented from adhering to the inside of the vacuum pump so that the maintenance operation is easier, although the conductance of an exhaust pipe system is lowered so that a trap unit and the vacuum pump can be reduced in size.

2. Information of the Related Art

In manufacturing processes for semiconductor devices, a semiconductor wafer (hereinafter referred to as "wafer") is subjected to various processes, such as CVD, etching, ashing, etc., using process gases in a vacuum. In these vacuum processes, exhaust gas that contains products of reaction and unaffected process gases, based on reactions of the process gases, is discharged through an exhaust pipe system in a process chamber. If unwanted by-products, such as the reaction products, unaffected gases, etc., adhere to the inside of the exhaust pipe system, however, exhaust pipes, valves, and vacuum pump must be cleaned. The cleaning of the exhaust pipe system involves troublesome operations, including removal of the exhaust pipes, valves, and vacuum pump and cleaning of the pump. If the reaction products are corrosive, moreover, the exhaust pipes or the like may possibly be corroded, so that adhesion of the reaction products to the exhaust pipe system must be minimized.

Conventionally, a vacuum processing apparatus is constructed in the manner shown in FIG. 4, in order to prevent the reaction products and other unwanted by-products from adhering to the exhaust system. In FIG. 4, numeral 1 denotes an airtight process chamber, which contains a wafer stage 11, having a heater therein, and a process gas inlet portion 12. The process chamber 1 is connected with an exhaust pipe 15, which is provided with a drag pump 13 and a dry pump 14. Thus, the exhaust pipe system is arranged so that after the process chamber 1 is first evacuated through a branch line 16 to a predetermined degree of vacuum by means of the dry pump 14, it can be further evacuated to a higher degree of vacuum by means of the drag pump 13.

A trap 17 is provided on the upstream side of the drag pump 13, and heating means, e.g., a tape heater, is wound around that portion of the exhaust pipe system between the exhaust port of the process chamber 1 and the trap 17. According to this arrangement, the exhaust pipe 15 can be heated to prevent the adhesion of the reaction products, and the reaction products can be cooled to a temperature lower than their sublimating points and compulsorily separated in the trap 17. Thus, the reaction products can be prevented from adhering to the exhaust pipe system on the downstream side. In FIG. 4, symbols Va, Vb and Vc designate valves.

Since the trap 17 is located on the upstream side of the drag pump 13, however, the apparatus with the above-described construction involves the following problems.

Since the trap 17 is subject to a substantial exhaust loss, the conductance of the exhaust pipe 15 must be increased, and the diameter of the pipe 15 is adjusted to about 4 to 8 inches, for example. Accordingly, the trap 17 and the drag pump 13 are expected to be large-sized. If the trap 17, which should be cleaned periodically, is located on the upstream side of the drag pump 13, water remaining in the cleaned trap 17 may possibly flow into the process chamber 1, thereby corroding the elements in the chamber 1 or exerting a bad influence on the process of a wafer W.

Accordingly, the inventors hereof intend to solve the above problems by locating the trap 17 on the exhaust side (downstream side) of the drag pump 13. To attain this, an arrangement is proposed such that a tape heater, for example, is wound around the drag pump 13, as well as the exhaust pipe, and products of reaction are passed in a gaseous phase through the pump 13.

In the drag pump 13, a rotor unit is located in a casing, which is provided with a water cooling jacket, and a distributor is located on the casing side so as to surround the rotor unit. The process chamber 1 is evacuated as the rotor unit is rotated. Even though the tape heater is wound around the casing, therefore, heat is absorbed by the water cooling jacket and the distributor, so that it cannot be easily transferred to the rotor unit. Thus, it is difficult to heat the rotor unit to a temperature of, for example, about 120!n, which is higher than the separation temperature of the reaction products.

It is hard for a conventional tape heater to heat the casing to a temperature such that the rotor unit temperature is increased to the aforesaid level. Accordingly, a special resistance heating element must be used to attain this, entailing substantially increased power consumption. If the casing is heated to too high a temperature, moreover, a sealing member of the drag pump will inevitably be degraded. In consequence, the casing temperature should not be increased excessively.

Even though the interior of the exhaust pipe and the inner wall of the casing are heated to a temperature high enough to prevent the adhesion of the products of reaction, therefore, the rotor unit cannot be heated to this temperature level, so that the reaction products adhere to the rotor unit, thus requiring frequent maintenance operation for the drag pump.

SUMMARY OF THE INVENTION

The object of the present invention is to provide a vacuum processing apparatus with a vacuum pump, in which products of reaction and the like can be prevented from adhering to the inside of the vacuum pump so that the maintenance operation is easier, although the conductance of an exhaust pipe system is lowered so that a trap unit and the vacuum pump can be reduced in size.

In order to achieve the above object, a first vacuum processing apparatus according to the present invention, which is adapted to subject an object of process to a predetermined process in a substantially vacuum state, comprises: an airtight process chamber for subjecting the object to a vacuum process in a vacuum formed as a process gas is introduced into the chamber; a vacuum pump connected to the process chamber by means of an exhaust pipe and used to rotate a rotor unit in a casing, thereby evacuating exhaust gas from the process chamber; and first heating means in the vacuum pump for heating the rotor unit and the rotor-side surface of the casing to a temperature higher than the temperature at which unwanted by-products in the exhaust gas discharged from the process chamber are separated.

A second vacuum processing apparatus according to the invention, which is adapted to subject an object of process to a predetermined process in a substantially vacuum state, comprises: an airtight process chamber for subjecting the object to a vacuum process in a vacuum formed as a process gas is introduced into the chamber; a vacuum pump connected to the process chamber by means of an exhaust pipe and used to rotate a rotor unit in a casing, thereby evacuating exhaust gas from the process chamber; first heating means in the vacuum pump for heating the rotor unit and the rotor-side surface of the casing to a temperature higher than the temperature at which unwanted by-products in the exhaust gas discharged from the process chamber are separated; a trap unit on the exhaust side of the vacuum pump for capturing the unwanted by-products in the exhaust gas from the process chamber; and second heating means for heating the inner surface of the exhaust pipe, which extends from the process chamber to the vacuum pump and from the vacuum pump to the trap unit, to a temperature higher than the temperature at which the unwanted by-products in the exhaust gas are separated.

Thus, the inside of the vacuum pump is heated by means of the first heating means to a temperature higher than the temperature at which products of reaction discharged from the process chamber are separated, and the inner surface of the exhaust pipe is heated to a temperature higher than the separation temperature by means of the second heating means. If the vacuum process is carried out in the process chamber in this state, the exhaust gas discharged from the process chamber can pass in a gaseous phase through the exhaust pipe and the vacuum pump without separating its unwanted by-products.

Thus, according to the present invention, the trap unit is located on the downstream side of the vacuum pump, and the exhaust gas can pass in a gaseous phase through the exhaust pipe and the vacuum pump without separating its unwanted by-products. Accordingly, the reaction products and the like can be prevented from adhering to the inside of the vacuum pump so that the maintenance operation is easier, although the conductance of the exhaust pipe is lowered so that the trap unit and the vacuum pump can be reduced in size.

If the first heating means is attached to a distributor that faces the interior of the vacuum pump, e.g., the rotor unit, heat can be efficiently transferred to the rotor unit, thereby heating it to a predetermined temperature, so that the reaction products can be securely prevented from adhering to the vacuum pump.

BRIEF DESCRIPTION OF THE DRAWINGS

FIG. 2 is a sectional view of a drag pump shown in FIG. 1;

DETAILED DESCRIPTION OF THE PREFERRED EMBODIMENTS

Preferred embodiments of the present invention will become understood from the following detailed description referring to the accompanying drawings.

Figure 1:
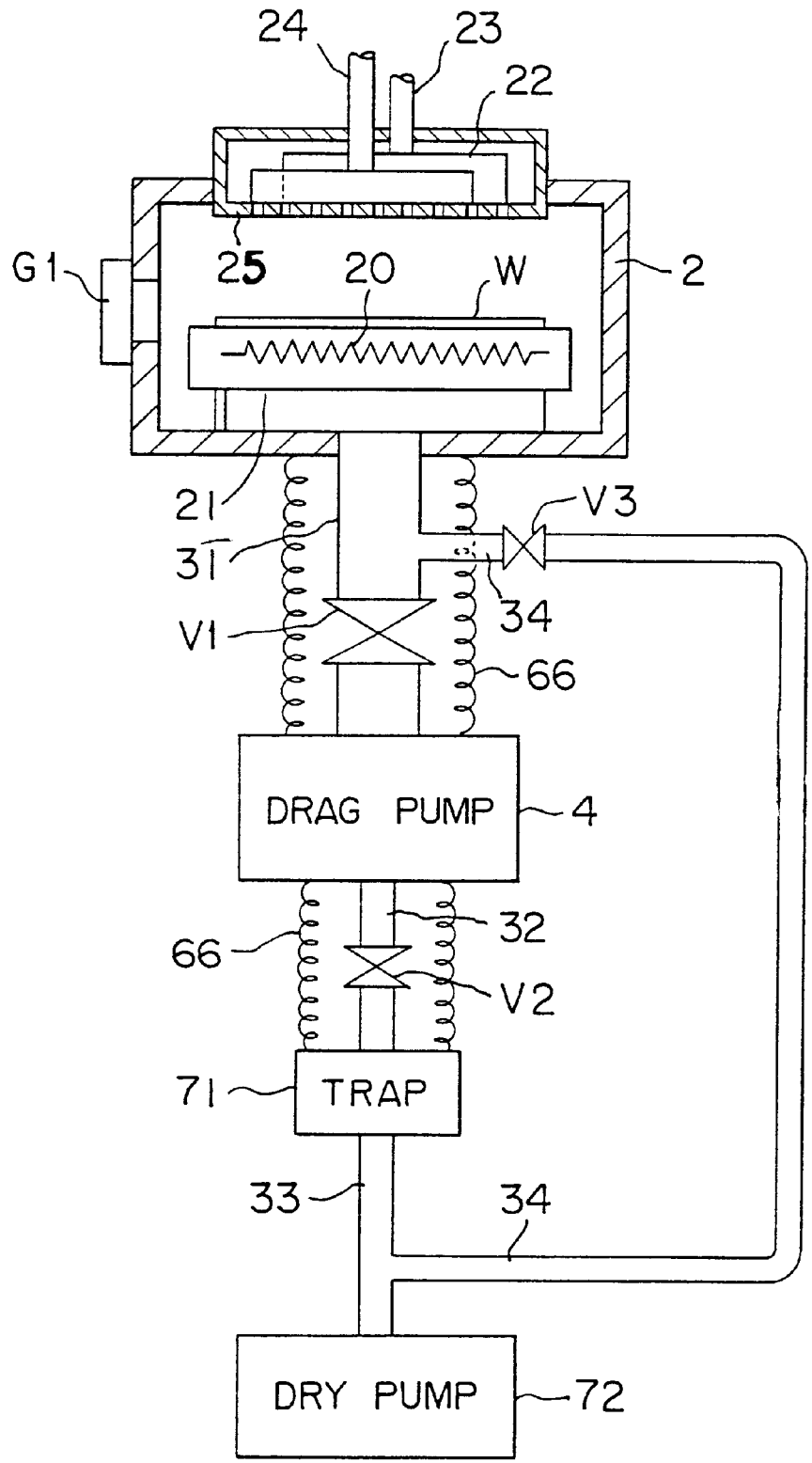
FIG. 1 is a schematic view of a vacuum processing apparatus according to one embodiment of the present invention.

FIG. 1 shows a vacuum processing apparatus according to one embodiment of the invention, which is constructed as a sheet-type thermal CVD apparatus.

In FIG. 1, numeral 2 denotes a process chamber, which has an airtight sealing structure for CVD. A wafer stage 21 for holding a semiconductor wafer W, an object of process, is set on the base of the process chamber 2. The wafer stage 21 is provided with a heater 20 for heating the wafer W to a predetermined temperature. A process gas supply unit 22 for feeding process gases into the process chamber 2 is arranged on the top of the chamber 2 so as to face the wafer stage 21. The supply unit 22 includes first and second gas supply pipes 23 and 24 and a gas jet plate 25 to which the respective end portions of the pipes 23 and 24 are connected. The gas supply pipes 23 and 24 are used to supply, for example, $TiCl_4$ gas and $NH_3$ gas, respectively, as the process gases. The pipes 23 and 24 are connected to sources (not shown) of liquid $TiCl_4$ and $NH_3$ gas, respectively. The side wall of the process chamber 2 is fitted with a gate valve G1 for opening and closing a delivery gate.

The base of the process chamber 2 is connected with one end of an exhaust pipe 31 with a diameter of 4 to 8 inches, which constitutes an exhaust line. A drag pump 4, a vacuum pump, is connected to the other end of the exhaust pipe 31 through a valve V1.

Referring now to FIG. 2, the drag pump 4 will be described in detail. Numeral 40 denotes a casing, the side wall of which is fitted with a water cooling jacket 40a. The casing 40 is formed with a suction port 41 at the top, and the lower end portion of the exhaust pipe 31 is connected to the suction port 41. An exhaust port 42, which is connected to an exhaust pipe 32 (mentioned later), is formed in the lower portion of the side wall of the casing 40.

According to the present embodiment, the casing 40 includes a casing body 400 and a cylindrical gas distributor 50 on the inner peripheral surface of the body 400. The inner surface of the distributor 50 is fitted with a plurality of stationary blades 51, which extend toward the center of the casing 40 and are arranged at intervals in the circumferential direction. First heating means, e.g., a resistance heating wire 61, is set in the outer peripheral surface of the distributor 50 (between tne distributor 50 and the casing body 400).

Further, a rotor unit 5 is provided in the casing 40. The rotor unit 5 is composed of a rotating shaft 52 extending in the axial direction of the casing 40 and a rotor 53 mounted on the top portion of the shaft 52. The rotating shaft 52 is supported in a support cylinder 44 on the central portion of the base of the casing 40 by means of bearings 45a and 45b, which are arranged individually in two positions on the inner surface of the cylinder 44, for example. A field winding 54 is attached to that portion of the inner surface of the cylinder 44 which is situated between the bearings 45a and 45b, while a magnetic coil 55 is wound around the rotating shaft 52, corresponding in position to the winding 54. The winding 54 and the coil 55 constitutes a motor unit.

The rotor 53 is provided with a plurality of first and second plate-like moving blades 53a and 53c, which are located on the upper and lower sides of the stationary blade 51, respectively. The outer edge portion of each moving blade 53a, 53c is situated close to the inner surface of the distributor 50. In this example, a gap between the outer surface of the rotor 53 and the distributor 50, the stationary blade 51, or the bottom of a notch 53b constitutes a vent passage.

A temperature sensor 63, for use as a temperature detecting unit, is attached to the lower part of the inner surface of, for example, the second moving blade 53c of the rotor 53 and the outer surface of the support cylinder 44 corresponding thereto. The sensor 63 is composed of a color developing member 63a on the inner surface of the moving blade 53c, for example, and a color sensor 63b on the outer surface of the support cylinder 44, for example. The color developing member 63a changes its color depending on temperature, and the color sensor 63b detects colors.

A disk-shaped reticulated plate 56 is mounted on the top of the distributor 50, and first heating means formed of, e.g., a helical resistance heating wire 62 is provided on the plate 56. The heating wires 61 and 62 are arranged so as to be controlled in accordance with detection signals from the temperature sensor 63 by a controller 64 through the medium of a power source 65.

As shown in FIG. 1, one end of the exhaust pipe 32 with a diameter of 1 to 2 inches, which constitutes the exhaust line, is connected to the exhaust side of the drag pump 4. A trap 71, for use as a trap unit, is connected to the other end of the exhaust pipe 32 through a valve V2. The downstream side of the trap 71 is connected to a dry pump 72 by means of an exhaust pipe 33 with a diameter of 1 to 2 inches, for example. A branch line 34, which diverges from the exhaust pipe 31, is connected to the exhaust pipe 33 through a valve V3. The exhaust pipes 31 and 32 and the valves V1 and V2, which are arranged between the process chamber 2 and the trap 71, are enclosed by second heating means, e.g., a tape heater 66, for heating the respective inner wall surfaces of those elements to a predetermined temperature.

The following is a description of the apparatus according to the aforementioned embodiment.

First, the process chamber 2 is evacuated through the branch line 34 to, for example, 1 to $5 \times 10^{-2}$ Torr by means of the dry pump 72. Then, the valves V3 and V1 are closed and opened, respectively, and the chamber 2 is evacuated to $10^{-6}$ to $10^{-7}$ Torr by means of the drag pump 4.

In the drag pump 4, the rotor 53 is rotated at high speed by the motor unit. As the rotor 53 rotates in this manner, the gas is sucked into the drag pump 4 through the suction port 41 and the reticulated plate 56, passes through the vent passage between the rotor 53 and the distributor 50 or the stationary blade 51, and is discharged through the exhaust port 42. Thus, the process chamber 2 is evacuated to a predetermined pressure.

Thereafter, the gate valve G1 is opened, and an object of process, e.g., a wafer W, from a load locking chamber (not shown) is carried into the process chamber 2 and set on the wafer stage 21. After the wafer W is heated to a predetermined temperature, e.g., 500 to 750° C., $TiCl_4$ and $NH_3$ gases are fed into the process chamber 2 through the gas supply pipes 23 and 24, respectively, of the process gas supply unit 22, and the chamber 2 is kept at a predetermined degree of vacuum by the evacuation by means of the drag pump 4. In this state, a TiN (titanium nitride) film is formed on the surface of the wafer W.

Besides TiN, during this film formation, $NH_4Cl$ (ammonium chloride) is formed as a by-product of reaction in the process chamber 2, and products of reaction between the components in the process gases or reaction between the respective components of the process gases and the wafer surface are discharged as unwanted by-products in exhaust gas into the exhaust pipe 31. The unwanted by-products include unaffected process gases.

On the upstream side of the drag pump 4, the respective inner surfaces of the exhaust pipe 31 and the valve V1 are heated to a temperature, e.g., 100 to 120° C., higher than the separation temperature of the products of reaction, by the tape heater 66. Accordingly, the reaction products are gaseous in this region, and are introduced into the drag pump 4. In the drag pump 4, the rotor unit 5 is heated sideways and from above by means of the resistance heating wires 61 and 62 on the outer surface of the distributor 50 and the upper surface of the reticulated plate 56, respectively, and the distributor 50 and the stationary blade 51 themselves are also heated. In this manner, the whole surface that faces the vent passage in the drag pump 4 are heated. Thus, the whole surface is heated to a temperature higher then the separation temperature of the reaction products, so that the products can remain gaseous as they pass through the drag pump 4.

Figure 3:
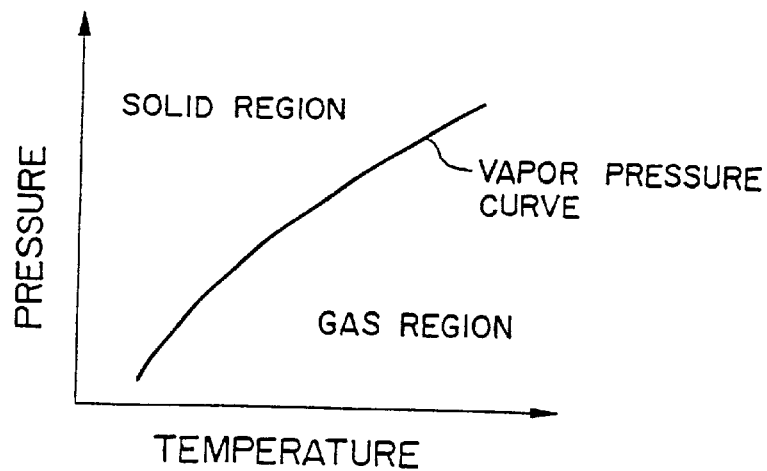
FIG. 3 shows an example of a vapor pressure curve.
Figure 4:
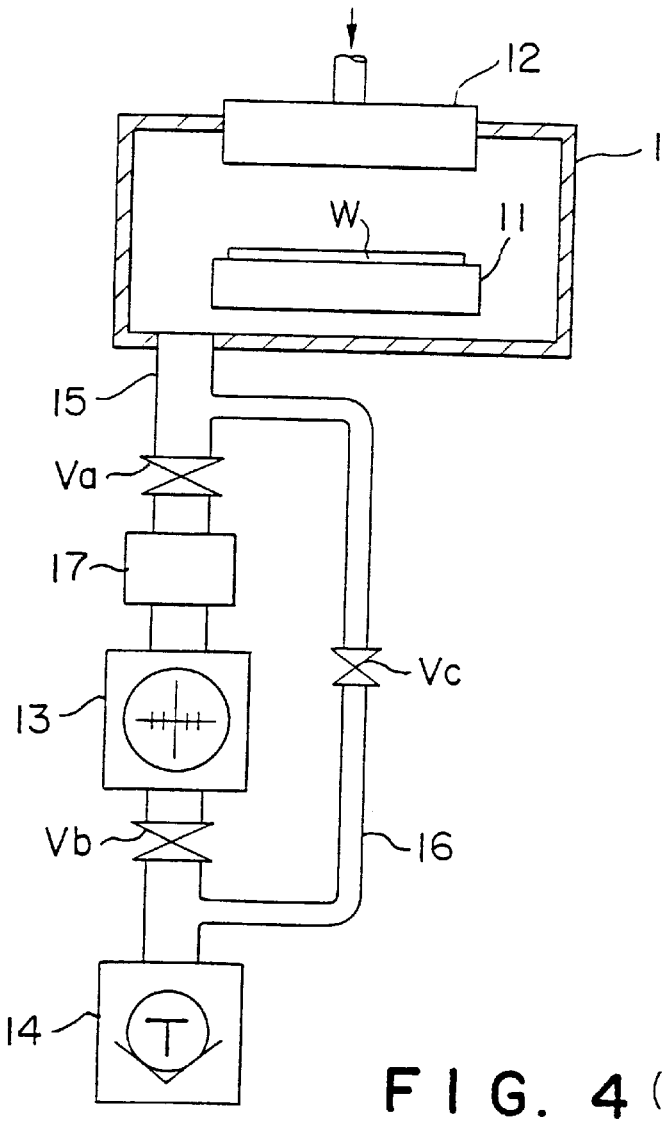
FIG. 4 is a diagram illustrating an exhaust pipe system of a conventional vacuum processing apparatus.

The phase of a substance, gaseous or not, can be determined in accordance the relationship between pressure and temperature, e.g., the one represented by the vapor pressure curve of FIG. 3. The temperature higher than the separation temperature of the products of reaction is a temperature on the gas-region side of the vapor pressure curve.

In the drag pump 4, the temperature of the rotor unit 5 is detected by detecting the change of the color of the color developing member 63a on the inner surface of the rotor 53, and the resistance heating wires 61 and 62 are controlled by means of the power source 65 so that the detected temperature is at a preset value.

The products of reaction having passed through the drag pump 4 are discharged into the exhaust pipe 32. For example, a refrigerant is circulated through the trap 71 so that the inner surface of the trap 71 is cooled to a temperature not higher than the separation temperature of the reaction products. As a result, the reaction products are separated and captured by the trap 71.

According to the embodiment described above, the rotor unit 5 is heated directly by radiant heat generated from the resistance heating wires 61 and 62 on the outer surface of the distributor 50 and the upper surface of the reticulated plate 56. Accordingly, the rotor unit 5, not to mention the distributor 50 and the stationary blade 51, can be efficiently heated to a predetermined temperature. Thus, the casing 40 itself need not be heated to so high a temperature as in the case where it is heated externally, so that a sealing member, e.g., an O-ring, of the casing 40 can be prevented from being degraded. Since the distributor 50 itself is heated by the heating wire 61, moreover, the inner surface of the vent passage can be heated to a predetermined temperature.

In this manner, the reaction products can be securely prevented from adhering to the inside of the drag pump 4, that is, the inner surface of the vent passage, and the necessary frequency of cleaning for the pump 4 can be reduced. Thus, the labor required for the troublesome cleaning of the rotor unit 5 can be eased, and the operating efficiency of the vacuum processing apparatus can be improved.

In detecting the temperature of the rotor unit 5, the color developing member 63a on the rotor-unit side is detected by means of the color sensor 63b on the stationary side, so that the rotor unit 5 need not be provided with signal lines. Accordingly, the arrangement for the temperature detection can be simplified. Since the temperature sensor 63 is situated off the vent passage for the reaction products in the drag pump 4, moreover, it never touches the products. Thus, the reaction products can be restrained from corroding or adhering to the temperature sensor 63.

Since the trap 71 is provided on the exhaust side of the drag pump 4, it can be miniaturized, and there is no possibility of water in the trap 71 flowing back into the process chamber 2 and exerting a bad influence on the process or corroding the elements in the process chamber 2.

Since a high conductance is required on the upstream side of the drag pump 4, the exhaust pipe used must have a diameter of, for example, 4 to 8 inches, and the trap size should match it. On the exhaust side of the drag pump 4, in contrast with this, the conductance need not be so high, and the diameter of the exhaust pipe is as small as 1 to 2 inches, so that a relatively small trap can be used.

According to the present invention, as described herein, the vacuum processing apparatus may be also applied to plasma CVD, etching, ashing, and other processes, as well as the formation of other films than the TiN film. Further, the first heating means is provided in the vacuum pump, whereby the inner surface that faces the vent passage in the vacuum pump is heated to a temperature higher than the temperature at which unwanted by-products in the exhaust gas from the process chamber are separated. Accordingly, the exhaust gas can be prevented from adhering to the inside of the vacuum pump, so that the maintenance operation can be made easier.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A vacuum pump comprising:
   a casing having an inlet through which a gas including an unwanted by-product is introduced into said casing;
   a rotor which is rotatably situated in said casing; and
   means for rotating said rotor;
   wherein said casing includes:
      a casing body providing an outer surface of said vacuum pump;
      an inner layer disposed on an inner surface of said casing body and having a thickness smaller than that of said casing body, said inner layer having a rotor-side surface facing said rotor; and
      heating means interposed between said casing body and said inner layer for heating said rotor and said rotor-side surface of said inner layer to a temperature higher than a temperature at which the unwanted by-product in the gas is separated.

2. A vacuum pump comprising:
   a casing having an inlet through which a gas including an unwanted by-product is introduced into said casing;
   a rotor which is rotatably situated in said casing;
   means for rotating said rotor; and
   heating means interposed between said inlet and said rotor, for heating said rotor.

3. The vacuum pump according to claim 2, wherein said heating means is situated along a plane crossing a stream of said gas introduced into said casing.

4. The vacuum pump according to claim 3, wherein said heating means comprises a reticulated plate and a heating member provided on said plate.

5. The vacuum pump according to claim 2, wherein said rotor has a top surface facing said inlet, and said heating means is disposed substantially parallel to said top surface.

6. The vacuum pump according to claim 5, wherein said heating means comprises a reticulated plate disposed substantially parallel to said top surface, and a heating member provided on said plate.

7. A vacuum pump comprising:
   a casing having an inlet through which a gas including an unwanted by-product is introduced into said casing;
   rotor which is rotatably situated in said casing; and
   means for rotating said rotor;
   wherein said casing includes:
      a casing body providing an outer surface of said vacuum pump;
      an inner layer disposed on an inner surface of said casing body and having a rotor-side surface facing said rotor;
      heating means interposed between said casing body and said inner layer for heating said rotor and said rotor-side surface of said inner layer to a temperature higher than a temperature at which the unwanted by-product in the gas is separated; and
      means for preventing heat generated by said heating means from travelling to the outside of said casing body, said means for preventing heat from travelling being formed as a vacancy within said casing body.

8. The vacuum pump according to claim 7, wherein said means for preventing heat from travelling is a water cooling jacket.

* * * * *